United States Patent [19]

Sherman

[11] Patent Number: 4,547,986
[45] Date of Patent: Oct. 22, 1985

[54] FRAMING SYSTEM

[75] Inventor: Charles F. Sherman, Townsend, Mass.

[73] Assignee: Nielsen Moulding Design Corp., Townsend, Mass.

[21] Appl. No.: 453,511

[22] Filed: Dec. 27, 1982

[51] Int. Cl.[4] .............................................. A47G 1/06
[52] U.S. Cl. ...................... 40/155; 403/401; 403/402
[58] Field of Search .................. 40/156, 157, 155; 403/401, 402, 403

[56]  References Cited

U.S. PATENT DOCUMENTS 2,654,451 10/1953 Schmidgall .
2,947,391  8/1960 Wayne .............................. 403/403
3,534,490 10/1970 Herbert .............................. 40/155
4,236,847 12/1980 Yasuda .............................. 403/402

Primary Examiner—Gene Mancene
Assistant Examiner—Cary E. Stone
Attorney, Agent, or Firm—John E. Toupal; Harold G. Jarcho

[57]   ABSTRACT

A frame system including a plurality of elongated frame members joined end to end to enclose a display area and each having an inwardly projecting wall portion for bordering a perimeter of a display piece and a rearwardly projecting, inwardly opening channel having transverse lips spaced apart by an inwardly facing slot. Joining the ends of each pair of contiguous frame members is a unitary bracket having leg portions disposed at an angle corresponding to the angle between the contiguous members and retained by the channels therein. Each of the leg portions comprises a guide surface defining retainer cavity juxtaposed to one of the slots and retaining a locking cam for securing the frame sections. Comprising each locking cam is a base portion retained by the retainer cavity and movable therein along a path determined by engagement with the guide surface thereof and a latch portion extending into the adjacent slot and movable by the movement of the base portion into forced engagement with one of the channel lips so as to securely latch together the frame member and the leg portion retained thereby.

18 Claims, 9 Drawing Figures

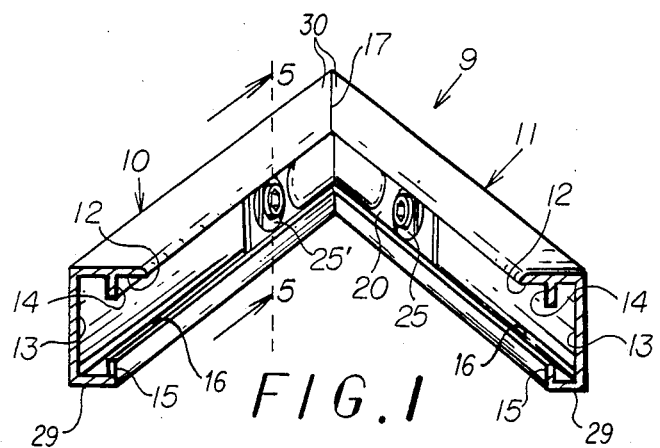
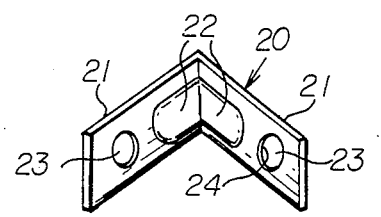
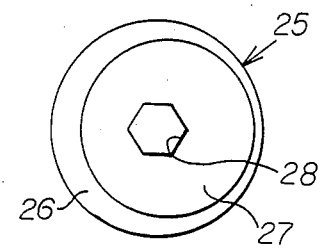
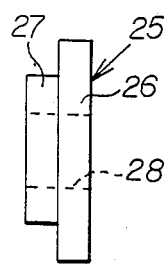
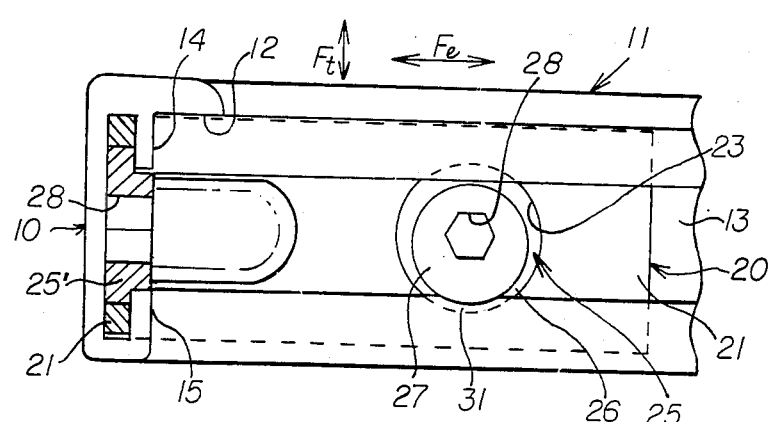

FRAMING SYSTEM

BACKGROUND OF THE INVENTION

A number of commercially available picture frames and frame sections are formed from extruded metal such as aluminum. These picture frames often are available in unassembled kit form. The most common technique for assembling the picture frame sections into the complete frame includes the provision of channels on the rear surface of each of the frame sections, with the channels of adjacent sections in the corners of the frame meeting in L-shaped configuration. Typically, the adjacent ends of the frame sections are assembled to form a corner of the frame, by placing an L-shaped bracket at each corner of the frame so that each leg of the bracket extends into the channel of one of the adjacent frame sections. Each of the bracket legs is secured to its associated framing section by suitable locking means, usually a screw which is threaded through the leg of the bracket and which is urged firmly against the rearwardly facing inner surface of the channel formed on the rear surface of each framing member. An example of such a frame is disclosed in U.S. Pat. No. 4,122,617.

While the above described framing system has been used extensively, it does have certain limitations. For example, because of the rearwardly opening channel sections, a display piece can be inserted only into an unassembled frame. Thus, each display piece substitution entails time consuming diassembly and reassembly of a particular frame. In addition, the individual frame sections with rearwardly opening channels are relatively massive and therefore require high material costs. These problems have been alleviated by rear loading frames composed of frame sections with inwardly opening channels. However, the above described types of corner securing systems are not applicable to the rear loading frames which have utilized more complicated, less effective or less versatile corner attachment mechanisms. For example, some rear loading frames are assembled by deforming corner brackets into engagement with frame members that are held in fixtures. Such a framing system is limited to relative large scale assembly operations and does not permit disassembly of individual frames.

The object of this invention, therefore, is to provide an improved, aesthetically desirable display frame that can be display loaded after assembly and is suitable for small scale assembly operations.

SUMMARY OF THE INVENTION

The invention is a frame system including a plurality of elongated frame members joined end to end to enclose a display area and each having an inwardly projecting wall portion for bordering a perimeter of a display piece and a rearwardly projecting, inwardly opening channel having transverse lips spaced apart by an inwardly facing slot. The lips project respectively from the inwardly directed wall portion and a rear wall of the channel. Joining the ends of each pair of contiguous frame members is a unitary bracket having leg portions disposed at an angle corresponding to the angle between the contiguous members and retained by the channels therein. Each of the leg portions comprises a guide surface defining retainer cavity juxtaposed to one of the slots and retaining a locking cam for securing the frame sections. Comprising each locking cam is a base portion retained by the retainer cavity and movable therein along a path determined by engagement with the guide surface thereof and a latch portion extending into the adjacent slot and movable by the movement of the base portion into forced engagement with one of the channel lips so as to securely latch together the frame member and the leg portion retained thereby.

According to one feature of the invention, the cam latch portions engage the lips projecting from the rear walls of the channels and the cam base portions are retained in the cavities in one dimension by the guide surfaces thereof and in another dimension by the inner surfaces of the lips. After engagement with the lips, the latch portions produce between the frame members and the retained leg portions opposing longitudinal forces along the longitudinal axes thereof and transverse forces orthogonal to the display area. The longitudinal forces are directed in a sense that draws together mitered ends of the joined wall portions and the transverse forces tend to align the front faces of the inwardly projecting wall portions.

According to another feature of the invention, the retainer cavity guide surfaces define circles, the cam base portions are rotatable therein and the cam latch portions are eccentric thereto. In response to rotation of the cam base portions, the eccentric latch portions are cammed into securing engagement with an adjacent lip. Rotational movement of the base portions is preferably achieved with a suitable tool that enters a recess in each cam mechanism.

According to yet another feature of the invention, the lips comprise retainer surfaces that overlay retained surfaces of the cam base portions with the cam mechanism in its engaged position. The lip retainer surfaces retain the cam base portions within the channel to establish with the engaged latch portions a secure connection between contiguous frame members.

In one embodiment of a frame system of the above featured type, the cam base portions comprise a maximum width less than the width of the channel slot and a length greater than that width so as to define the retained surfaces thereof. According to this embodiment, the cam base portions can be inserted through the slot into the channel while in an unlatched orientation and then rotated into a latched position wherein the latch portions engage the lips and the base portions are retained by the retainer surfaces thereof.

According to still another feature of the invention, each bracket leg portion comprises a plurality of the retainer cavities. The plural retainer cavities facilitate repeated assembly of given frame members by providing a fresh lip surface for engagement with the cam latch portions. By utilizing a different retainer cavity during successive assembly operations, an intact lip surface is provided for engagement with a cam latch portion.

DESCRIPTION OF THE DRAWINGS

These and other features and objects of the invention will become more apparent upon a perusal of the following description taken in conjunction with the accompanying drawings wherein.

FIG. 1 is a schematic perspective view of a frame corner joined according to the invention;

FIG. 2 is a schematic perspective view of a corner bracket used in the corner joint of FIG. 1;

FIG. 3 is a schematic plan view of a cam mechanism used in the corner joint of FIG. 1;

FIG. 4 is a schematic side view of the cam mechanism shown in FIG. 3;

FIG. 5 is a schematic cross-sectional view taken along lines 5—5 of FIG. 1 and showing a cam mechanism in an engaged securing position;

DESCRIPTION OF THE PREFERRED EMBODIMENTS

Figure 6:
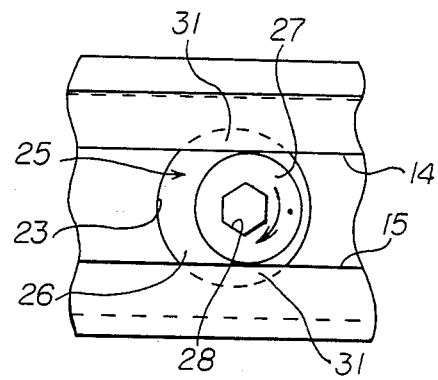
FIG. 6 is a schematic view similar to that shown in FIG. 5 but with the cam mechanism in an unengaged position.

FIG. 1 shows a typical corner junction 9 of the frame invention as viewed from the inner display area enclosed by the frame. Included in the corner 9 are a pair of elongated frame members 10, 11 which preferably are formed from a relatively soft extruded material such as aluminum or the like. Each of the frame members 10, 11 is of substantially identical cross-sectional configuration having an inwardly projecting wall portion 12 and a rearwardly projecting channel 13. The wall portions 12 define a display area for a display piece (not shown). Each of the channels 13 includes transversely extending lips 14, 15 spaced apart by an inwardly facing longitudinal slot 16. Preferably the ends 17 of the frame members 10, 11 are mitered and orthogonally joined to create a corner of a rectangularly shaped composite frame (not shown).

Joining each corner 9 of such a frame is a unitary securing bracket 20 shown more clearly in FIG. 2. The unitary securing bracket 20 comprises a pair of leg portions 21 disposed at an angle corresponding to the joining angle of the frame members 10, 11. Preferably the leg portions 21 are disposed orthogonally so as to create a rectangularly shaped frame structure. A concave-convex mid-portion 22 of the bracket 20 provides additional strength and structural stability therefor. The leg portions 21 of the bracket 20 are retained by the channels 13 of contiguous frame members 10, 11 and have widths slightly smaller than the channels 13 as shown in FIG. 6. Defined by each leg portion 21 is a circular retainer cavity 23 transversely centrally located so as to be in juxtaposition to the slots 16 defined by the channels 13. As shown in FIG. 2 each of the retainer cavities 22 defines a circular guide surface 24.

Retained by each of the retainer cavities 23 is a locking cam mechanism 25 preferably made of a hard material such as steel and shown more clearly in FIGS. 3 and 4. Each of the cam mechanisms 25 includes a circular base portion 26 with a diameter corresponding to that of the guide surfaces 24 of the retainer cavities 23. Also included in each cam mechanism 25 is a circular latch portion 27 projecting transversely from the base portion 26 but eccentric thereto and projecting into the slots 16 defined between the channel lips 14, 15. Extending through the latch portion 27 and the base portion 26 is a hexagonal recess 28 for receiving a conventional Allen wrench. The recess 28 is axially aligned with the base portion 26.

OPERATION OF THE PREFERRED EMBODIMENT

Referring now to FIGS. 5 and 6 there is shown the manner in which the brackets 20 and the cam mechanisms 25 are utilized to join the mitered ends of contiguous frame members 10, 11. During assembly of a frame, the base portion 26 of a cam mechanism 25 is first inserted into the retainer recess 23 of each leg portion 21. The leg portions 21 of a bracket 20 are then inserted into the channels 13 of the contiguous frame members 10, 11. As shown in FIG. 6, the rotational position of the base portions 26 in the retainer cavities 23 is such as to align the latch portions 27 with the slots 16 in the frame members 10, 11 so as to permit unencumbered movement therethrough. The width of a slot 16 is less than the diameter of the base portion 26 such that the lips 14, 15 define retainer surfaces 31 that overlay retained surfaces of the base portion. Thus, the base portion 26 is restrained from movement in one dimension by the guide surface 24 of the retainer cavity 23 and in another orthogonally related dimension by the retainer surfaces 31 of the lips 14, 15.

After the mitered ends of a pair of contiguous frame members 10, 11 have been brought together, the cam members 25 are activated to produce secure latching thereof. During the cam activation procedure, an Allen wrench is inserted into the recess 28 and turned to rotate the cam base portion 26 within the retainer cavity 23 along the guide surface 24. This rotation of the base portion 26 produces a transverse movement of the eccentric latching portion 27 into engagement with the lip 15 extending from a rear surface 29 of the channel 13. In response to engagement, the relatively hard cam latching portion 27 gouges out the relatively soft lip 15 creating a secure attachment therebetween as shown in FIG. 5. Since the cam members 25 are immovably retained within the retainer cavities 23 of the unitary bracket 20, the latching of a pair of cam members secures together the mitered ends of the engaged frame members 10, 11. During the latching movement of the cam member 25, longitudinally directed forces $F_l$ are created between the engaged frame member 11 and retained bracket leg portion 21 (FIG. 5). These forces tend to produce relative longitudinal movement between the bracket leg portion 21 and engaged frame member 11 and are selected so as to draw together the mitered ends of contiguous frame members 10, 11. Also produced between the frame member 11 and the retained leg portion 21 are transverse forces $F_t$ directed orthogonally to the display area framed. The transverse forces are selected to cause engagement between the bracket leg portions 21 and the inwardly projecting wall portions 12 thereby aligning the front faces 30 thereof. As shown in FIG. 5, for example, the cam member 25 is rotated clockwise into engagement with the lip 15 whereby the forces $F_l$ tend to move the frame member 11 to the left relative to the bracket leg portion 21. Conversely, the cam member 25' would be rotated counter clockwise into engagement with the adjacent lip 15 so as to produce longitudinal movement of the frame member 10 to the right relative to the retained leg portion 21. In addition, the resultant forces $F_t$ move the leg portions 21 into engagement with the inner surfaces of the wall portions 12. Thus, the forces $F_l$ and $F_t$ generated by latching operation of the cam members 25, 25' both draw together and securely retain the mitered ends of contiguous frame members 10, 11 and align the front faces 30 thereof.

Figure 7:
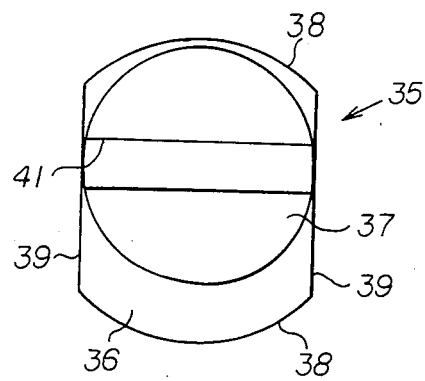
FIG. 7 is a schematic plan view of a modified cam mechanism.
Figure 8:
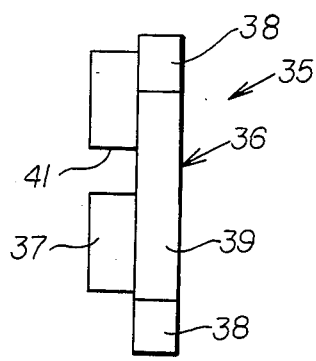
FIG. 8 is a side view of the cam mechanism shown in FIG. 7.

Referring now to FIGS. 7 and 8 there is shown another locking cam mechanism 35 that can be used in place of the cam mechanism 25 shown in FIGS. 3 and 4. The cam mechanism 35 includes a base portion 36 and a circular latch portion 37 projecting axially therefrom. Forming the sidewalls of the base portion 36 are diametrically opposed circular sections 38 separated by parallel planar sections 39. The diameter of the circular sections 38 corresponds to that of the circular guide surfaces 24 in the retainer cavities 23 and the spacing between the planar sections 39 is less than the widths of the slots 13 in the frame members 10, 11. Defined by the latch portion 37 is a slot 41 for receiving the working end of a conventional screwdriver (not shown). As with the cam embodiment 25, the latch portion 37 projects eccentrically from the circular sidewall sections 38.

The use of the cam mechanism 35 is similar to that described above for the cam mechanism 25. After the ends of a pair of frame members have been brought into engagement, the previously inserted cam mechanisms 35 are rotated along the guide surfaces 24 within the retainer cavities 23. That movement cams the latch portions 37 into contact with the lips 14 to create a secure attachment therebetween. A unique advantage of the cam mechanism 35, however, is the ability to be operationally installed after the bracket legs 21 have been inserted into the channels of contiguous frame members 10, 11. By aligning the parallel sidewall sections 39 with the longitudinal axis of a slot 13, the base portion 37 can be passed therethrough into a retainer cavity 23. Thus, assembly of a complete frame is simplified.

Figure 9:
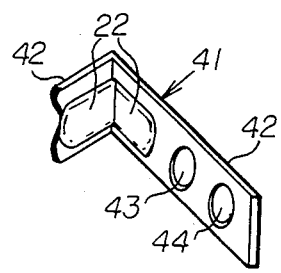
FIG. 9 is a schematic perspective view of a modified corner bracket.

FIG. 9 shows another bracket embodiment 41 with orthogonally oriented legs 42 that can be used in place of the bracket 20. The bracket 41 is used similarly to the bracket 20 during the assembly of a composite frame with the frame members 10, 11. However, a unique functional advantage is obtained by providing each of the legs with a pair of longitudinally aligned retainer cavities 43, 44 each identical to the above described retainer cavities 23. During initial assembly of a frame with the brackets 41, a single cam mechanism 25 or 35 is employed in either of the retainer cavities 43 or 44 to provide a secure attachment by deforming an adjacent portion of a lip 12 as described above. If that frame is subsequently disassembled and then reassembled, the cam mechanism 25 or 35 is inserted into that retainer cavity 43 or 44 not used in the original assembly. Consequently, fresh unimpaired portions of the lips 15 are available for engagement with the latch portions 27 or 37. This provision of previously unused portions of the lips 15 insures that secure engagements will be created between the frame members and the corner brackets.

Obviously, many modifications and variations of the present invention are possible in light of the above teachings. It is to be understood, therefore, that the invention can be practiced otherwise than as specifically described.

What is claimed is:

1. A framing system comprising:
    a plurality of elongated frame members having mitered ends joined to enclose a display area, each of said members having an inwardly projecting wall portion for enclosing the perimeter of a display piece in said area and a rearwardly projecting channel with transversely extending lips projecting respectively from said wall portion and a rear wall of said channel, said lips being spaced apart by an inwardly facing longitudinal slot and each of said channels communicating with corresponding channels in contiguous ones of said members;
    a unitary securing bracket joining the ends of each pair of said contiguous members and having leg portions disposed at an angle corresponding to the angle between said contiguous members and retained by said channels therein, each of said leg portions comprising a retainer cavity juxtaposed to one of said slots and defining guide surface means; and
    a locking cam means retained by each of said cavities, each said locking cam means comprising a base portion retained by said cavity and movable therein along a path determined by engagement with said guide surface means and a latch portion extending into one of said slots and movable by said movement of said base portion into forced engagement with only one of said lips so as to securely latch together said frame member and said leg portion retained thereby, said latch portions during engagement with said one engaged lip producing between said frame members and said leg portions opposing longitudinal forces directed along the longitudinal axes thereof so as to draw together said joined ends.

2. A system according to claim 1 wherein after engagement of said latch portion with said lip said base portion is retained in said cavity in one dimension by said guide surface and in another dimension by the inner surfaces of said lips.

3. A system according to claim 1 wherein said engaged lips and latch portions also produce between said frame members and said leg portions transverse forces directed orthogonally to said display area.

4. A system according to claim 3 wherein said transverse forces tend to produce relative movement that moves said leg portions toward said inwardly projecting wall portions.

5. A system according to claim 4 wherein said lip engaged with said latch portion projects from said rear wall of said channel.

6. A system according to claim 5 wherein after engagement of said latch portion with said lip said base portion is retained in said cavity in one dimension by said guide surface and in another dimension by the inner surfaces of said lips.

7. A system according to claim 6 wherein said guide surface means define a circle, said base portions are rotatable therein, and said latch portions are eccentric thereto.

8. A system according to claim 7 wherein each of said cam means define a recess for receiving a tool manually operable to produce said rotation of said base portion.

9. A system according to claim 10 wherein said lips comprise retainer surfaces that overlay retained portions of said base portions with said cam means in said engaged positions.

10. A system according to claim 9 wherein each of said base portions comprise a maximum width less than the width of said slot and a length greater than said width of said slot so as to define said retained portions.

11. A system according to claim 9 wherein said guide surface means define a circle, said base portions are rotatable therein, and said latch portions are eccentric thereto.

12. A system according to claim 11 wherein each of said cam means define a recess for receiving a tool manually operable to produce said rotation of said base portion.

13. A system according to claim 1 wherein each of said leg portions comprises a plurality of said retainer cavities.

14. A system according to claim 1 wherein said frame members are formed from a material substantially less hard than said latch portions.

15. A framing system comprising:
- a plurality of elongated frame members having mitered ends joined to enclose a display area, each of said members defining a channel communicating with a corresponding channel in contiguous ones of said members;
- a unitary securing bracket joining the ends of each pair of said contiguous members and having leg portions disposed at an angle corresponding to the angle between said contiguous members and retained by said channels therein; and
- locking means engaged between said leg portions and each of said members and inducing therebetween net longitudinal forces directed along the longitudinal axes thereof and transverse forces directed transversely to said axes, said net longitudinal forces being directed in a sense that produces relative longitudinal movement between said leg portions and said members so as to draw together said mitered ends of said contiguous members and said transverse forces being orthogonal to said display area.

16. A system according to claim 15 wherein each of said members define a front surface enclosing a segment of said dislay area, and said transverse forces tend to produce relative movement between said leg portions and said members that moves said leg portions toward said front surfaces.

17. A system according to claim 16 wherein said locking means comprise a locking mechanism engaging each of said channels and a said leg portion retained thereby in a manner to produce said longitudinal and transverse forces.

18. A system according to claim 17 wherein said frame members are formed from a material substantially less hard than said locking mechanisms.

* * * * *